(12) United States Patent
Wilde et al.

(10) Patent No.: US 6,689,286 B2
(45) Date of Patent: Feb. 10, 2004

(54) SHAPED THERMAL INSULATION BODY

(75) Inventors: Eugen Wilde, Knittlingen-Freudenstein (DE); Guenter Kratel, Durach (DE); Bernhard Mikschl, Sulzfeld (DE); Horst Pfob, Eppingen (DE); Erich John, Pforzheim (DE)

(73) Assignee: E.G.O. Elektro-Geraetebau GmbH (DE)

( * ) Notice: Subject to any disclaimer, the term of this patent is extended or adjusted under 35 U.S.C. 154(b) by 0 days.

(21) Appl. No.: 10/084,044

(22) Filed: Feb. 27, 2002

(65) Prior Publication Data

US 2002/0148391 A1 Oct. 17, 2002

(30) Foreign Application Priority Data

Feb. 28, 2001 (DE) .......................... 101 10 730

(51) Int. Cl.[7] .................................. E04B 1/74
(52) U.S. Cl. .................. 252/62; 106/600; 106/602; 106/792; 106/796
(58) Field of Search .................. 252/62; 106/600, 106/602, 792, 796

(56) References Cited

U.S. PATENT DOCUMENTS

| 4,985,163 A | 1/1991 | Kratel et al. |
|---|---|---|
| 5,362,541 A | 11/1994 | Sextl et al. |
| 5,556,689 A | 9/1996 | Kratel et al. |
| 5,685,932 A | 11/1997 | Stohr et al. |
| 5,911,903 A | 6/1999 | Eyhorn et al. |
| 6,080,475 A | 6/2000 | Frank et al. |
| 6,380,114 B1 * | 4/2002 | Brandy ........................ 501/128 |

FOREIGN PATENT DOCUMENTS

| DE | 19644282 A1 | 4/1998 |
|---|---|---|
| EP | 0 315 169 A2 | 5/1989 |
| EP | 0623567 B1 | 11/1994 |
| WO | WO 01/09057 A1 | 2/2001 |

* cited by examiner

Primary Examiner—Paul Marcantoni
(74) Attorney, Agent, or Firm—Akerman Senterfitt

(57) ABSTRACT

A shaped thermal insulation body comprises inorganic material. The shaped body has the following, weight-related composition: approx. 20 wt. % inorganic filling material: approx. 40 wt. % opacifier; approx. 10 wt. % fibrous material; and approx. 15 wt. % hardening agent as well as approx. 15 wt. % water. The shaped body only contains a small amount of fumed silica with a comparatively small BET surface. Water glass is excluded during its manufacture. It can be used as a spacer for radiant heaters.

19 Claims, 2 Drawing Sheets

SHAPED THERMAL INSULATION BODY

Figure 1:
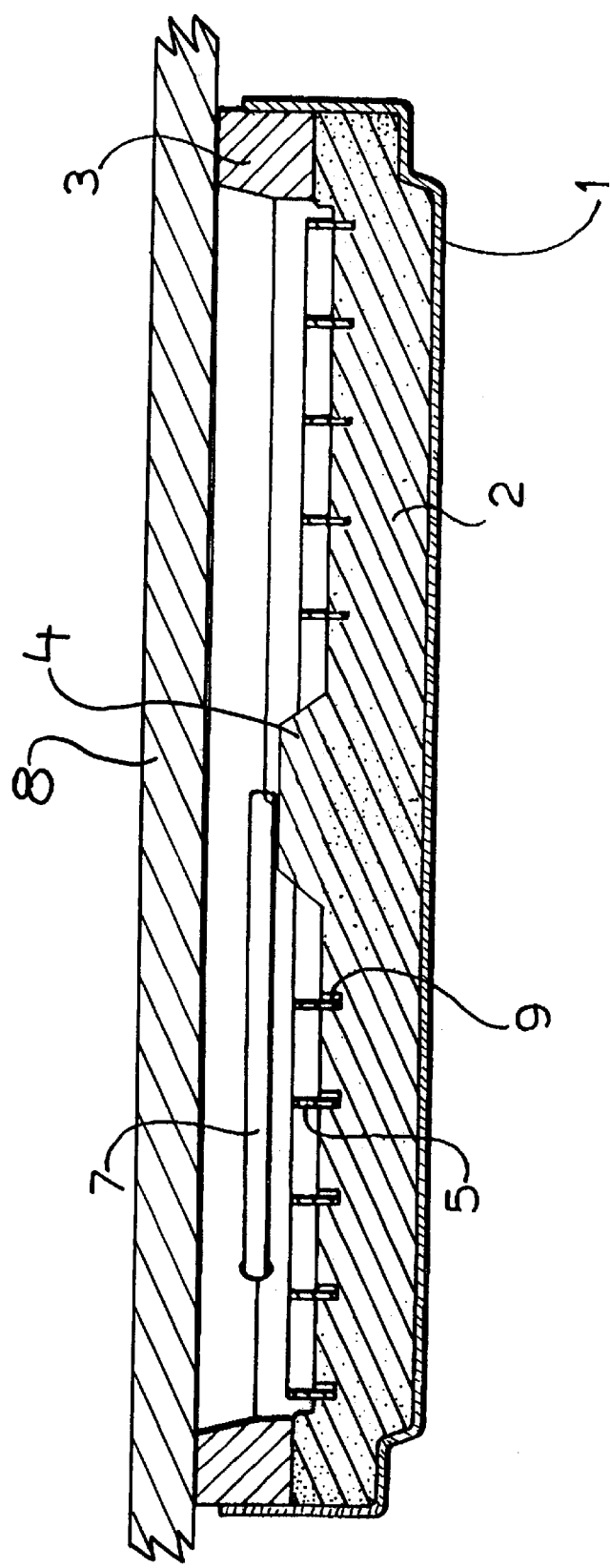

The invention relates to a thermally insulating shaped body of inorganic material, a method for the manufacture of the shaped body and a use thereof. The invention more particularly relates to a thermally insulating shaped body, which is suitable as a spacer in radiant heaters for cookers and baking ovens.

DE 196 44 282 discloses a thermally insulating shaped body of expanded vermiculite, inorganic binder, infrared opacifier, microporous material and reinforcing fibres. Water glass is used in preferred manner as the inorganic binder.

EP 623 567 discloses a method for the manufacture of a thermal insulation body of fumed silica, opacifier, organic fibres and one or more compounds from the group of oxides, hydroxides and carbonates of metals of the second main group of the periodic system. The fumed silica content is high and in specific embodiments 50 to 60 wt. %.

Binders such as water glass in DE 196 44 282 contain sodium and potassium ions, so that the material is not electrically neutral and also, as with fumed silica, has a high water adsorption potential. Therefore with the shaped bodies used at present as thermal insulators the following problems arise:

high moisture absorption of the system;

high voltage testing according to protection class 2 with 3750 V between the heating resistors and set down saucepan can only be successfully completed with an additional high voltage phase on the top of the ring;

due to the leakage current during high voltage testing (protection class 1 against grounded parts) milled recesses are necessary in the vicinity of live parts and lead to a power leak;

through the use of water glass, the necessary electrical insulating properties are not ensured.

The problem of the invention is to provide a thermally insulating shaped body which avoids the indicated disadvantages and which in particular has a better hardening mechanism.

This problem is solved by a shaped thermal insulation body having the features of claims 1 and 19 and a method having the features of claim 20. According to the invention, a thermally insulating shaped body is characterized by the following, weight-related composition:

a) 5 to 70 wt. % inorganic filling material, b) 5 to 50 wt. % opacifier, c) 1 to 25 wt. % hardening agent and d) min. 0.5 wt. % water.

The method according to the invention is characterized in that the mixing of the three aforementioned components takes place accompanied by the addition of water. This addition can take place together with one of the components of the mixture or separately.

Preferred further developments of the thermally insulating shaped body according to the invention and the production method are given in the subclaims. By express reference, the subject matter of the claims is made into part of the content of the description.

The shaped body according to the invention contains 5 to 70, preferably 15 to 20 wt. % inorganic filling materials. Preference is given to the use of silicon compounds, fumed silica, arc silica, precipitation silica, silicon dioxide aerogels, wollastonite, $Ca_3[Si_3O_9]$, perlite, vermiculite, talc, mica, silica and vitreous bodies. It is also possible to use aluminium compounds such as Al2O3, clay bauxite and clay. These filling materials can be used alone or as mixtures.

For improving the thermal insulation, the shaped body contains 5 to 50, preferably 25 to 40 wt. % opacifier. Suitable opacifiers are ilmenite, rutile, zirconium dioxide, silicon carbide, titanium oxide, zirconium oxide, zirconium silicate, manganese oxide and iron II/iron III mixed oxides. With particular preference silicon carbide is used.

Oxides and/or hydroxides of the II and/or III main group of the periodic system are used as hardening agents. Examples are CaO, MgO, $B_2O_3$, $Ca(OH)_2$, $Mg(OH)_2$, $Al(OH)_3$ or $B(OH)_3$. It is also possible to use mixed oxides of the II and/or III and/or IV main group of the periodic system. Preference is given to cement. Preferably Portland cement and high alumina cement are used.

The hardening agent can also comprise mixtures of oxides and/or hydroxides and/or mixed oxides. For reaction purposes the aforementioned hardening agents must be added together with water or as an aqueous suspension to the mixture. The water quantity can be between 0.5 and 35 wt. %, preferably 3 and 20 wt. % and can e.g. be 15 wt. %.

An advantageous shaped body contains 1 to 20 wt. %, preferably 1.5 to 5 wt. % inorganic fibres. Preferably use is made of fibres of $SiO_2$, such as quartz glass, silica fibres, R-glass, S2-glass, ECR-glass and similar glasses, as well as random mixtures of such fibres.

One advantage resulting from the invention is that the shaped thermal insulation body contains no conductive, mobile ions and no water glass. Therefore factors, which can lead to leakage current problems, such as e.g. ions or adsorbed water, can be avoided. Thus, there is no longer a need for high voltage phases on the top of the ring, as well as milled recesses in the vicinity of live parts and which lead to power leaks.

The method for the manufacture of the shaped thermal insulation body according to the invention is characterized in that initially the inorganic filling material, opacifier and hardening agent are mixed. Water is added to the mixture. The hardening agent can be added as an aqueous suspension or the water is added separately or to one of the other components of the mixture. This mixture is pressed and subsequently hardened at a hardening temperature of 250° to 700° C.

The shaped thermal insulation body according to the invention is particularly suitable as a spacer in radiant heaters for cookers and baking ovens.

Hereinafter is provided an example of a conventional, shaped thermal insulation body and two comparison examples of an inventive, shaped thermal insulation body.

The tests were performed with a shaped thermal insulation body (STIB) in the form of a spacer ring of a radiant heater with a diameter of 180 mm. The mixtures were mixed in a cyclone mixer at 3000 r.p.m. and for 5 min, the weight being 1 kg. The STIB was pressed with a hydraulic press under a pressure of approximately 50 kg/cm2.

1) Comparison mixture:

36 wt. % silica BET surface 200 m2/g 1.5 wt. % S2-fibres 35.5 wt. % vermiculite BET surface 13 $m^2/g$ 27 wt. % potassium water glass STIB weight 73 g STIB density 0.82 $g/cm^3$ Measurement of the plate temperature on the outside in the case of a radiant heater with a power of 1800 W:

plate bottom temperature: 260° C.

plate edge temperature: 265° C.

Measurement of the electrical conductivity of the ring:

The ring was brought between two metal disks into the moist space at 30° C. and 93% relative atmospheric humidity. Between the two metal disks was then applied a voltage of 250 V and the current flowing through the ring was measured. Measured current after:

24 h 21 mA
48 h 38 mA
72 h 50 mA

2) First mixture according to the invention:

30 wt. % fumed silica BET surface 130 m$^2$/g
3 wt. % S2-fibres
35 wt. % silicon carbide
24 wt. % arc silica BET surface 30 m$^2$/g
8 wt. % white lime
+10 g water per ring
STIB weight 60 g
STIB density 0.67 g/cm$^3$ Measurement of the plate temperature on the outside in the case of a radiantheater with a power of 1800 W:

plate bottom temperature: 237° C.
plate edge temperature: 235° C.

Measurement of the electrical conductivity of the ring:

The ring was brought between two metal disks into the moist space at 30° C. and 93% relative atmospheric humidity. A voltage of 250 V was then applied between the two metal disks and the current flowing through the ring was measured. Measured current after:

24 h 5.5 mA
48 h 7.5 mA
72 h 10.0 mA

3) Second mixture according to the invention:

40 wt. % fumed silica BET surface 130 m$^2$/g
2 wt. % S2-fibres
40 wt. % silicon carbide
10 wt. % aluminium oxide
8 wt. % white lime
ñ 10 g water per ring
STIB weight 60 g
STIB density 0.67 g/cm$^3$ Measurement of the plate temperature on the outside in the case of a radiantheater with a power of 1800 W:

plate bottom temperature: 235° C.
plate edge temperature: 233° C.

Measurement of the electrical conductivity of the ring:

The ring was brought between two metal disks into the moist space at 30° C. and 93% relative atmospheric humidity. A voltage of 250 V was then applied between the two metal disks and the current flowing through the ring was measured. Current measured after:

24 h 1.8 mA
48 h 2.3 mA
72 h 4.5 mA

The electrical insulating characteristics were consequently clearly improved. In the case of mixture 3) there was only a negligible residual current.

These and further features can be gathered from the claims, description and drawings and individual features, both singly and in the form of subcombinations, can be implemented in an embodiment of the invention and in other fields and can represent patentable forms for which protection is claimed here. The subdivision of the application into individual sections and the subtitles in no way restrict thegeneral validity of the statements made thereunder.

An embodiment of the invention is described hereinafter relative to the drawings, wherein show:

FIG. 1 A section through a radiant heater with a shaped thermal insulation body according to the invention.

Figure 2:
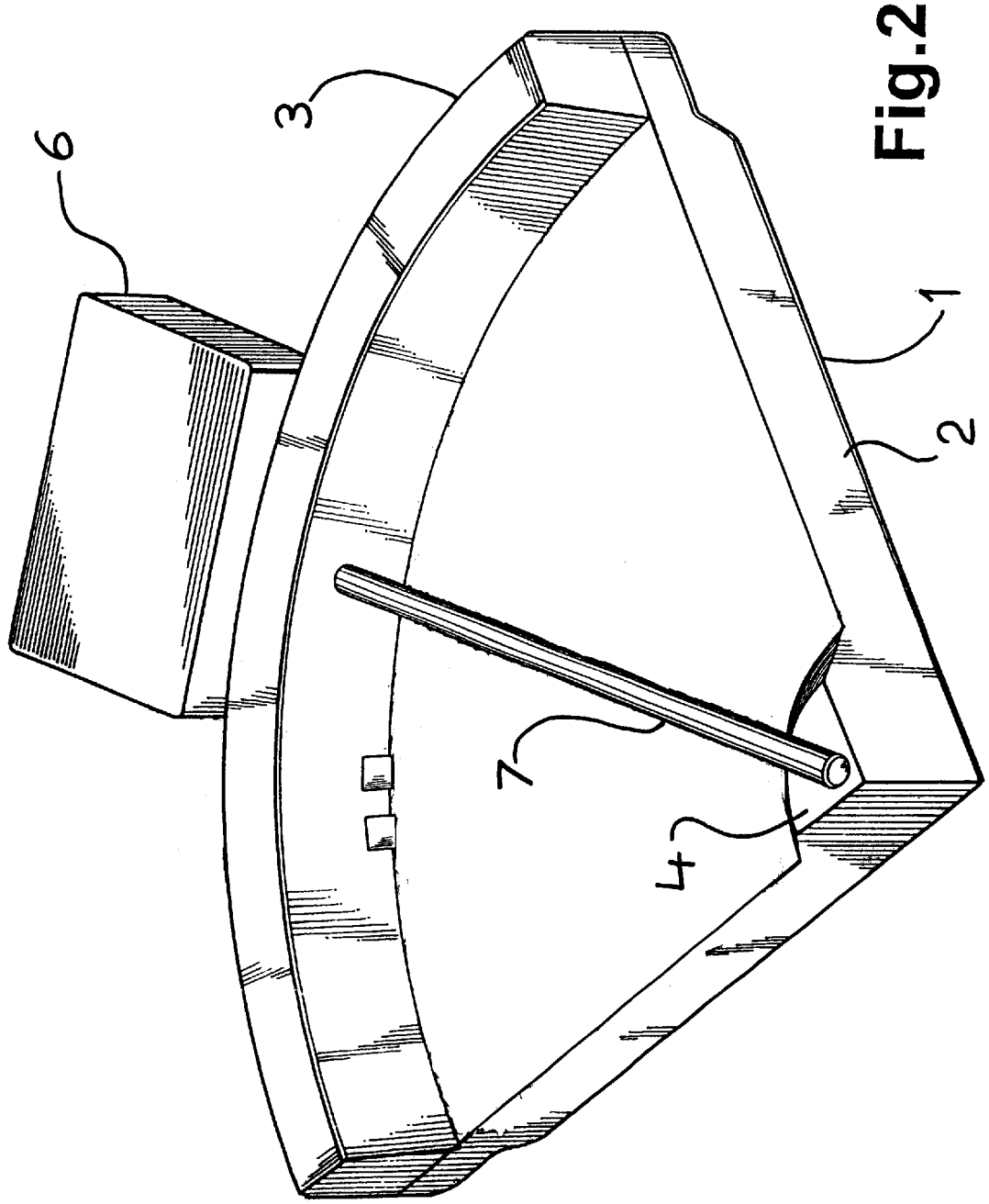

FIG. 2 An inclined view of the radiant heater of FIG. 1.

FIGS. 1 and 2 show an electric radiant heater, which is pressed onto the underside of a glass ceramic plate 8. The radiant heater has a reception tray 1, preferably of sheet metal and in it is inserted as the base 2 a shaped thermal insulation body. The base 2 in known manner carries heating resistors 5 in recesses 9.

In the central area the base 2 has a frustum-shaped protuberance 4, which serves as a support for the temperature sensor 7 of the temperature controller 6. This is adequately known from the prior art.

Within the reception tray 1, an external, circumferential edge or border 3 rests on the outer area of the base 2. Said edge 3 serves as a spacer in order to keep the radiant heater at a predetermined distance from the glass ceramic plate 8. It also forms a thermal insulation to the side.

To facilitate understanding, in FIG. 2 the heating resistors 5 and associated recesses 9 are not shown.

The drawings make it clear that the requirements on the thermal insulation in the form of base 2 and the spacer in the form of edge 3 are different. The base 2 carries the heating resistor 5 and is consequently exposed to higher temperatures. Significance is again attached to the improved compatibility of the rapid heating. It must also be constructed for the fastening of the heating resistors 5.

The edge 3 requires a certain strength, particularly compression strength, in order to be able to absorb the contact pressure. In addition, there are thermal insulation requirements.

What is claimed is:

1. A shaped thermal insulation body of inorganic material with at least the following, weight-related components:
a) 5 to 70 wt. % inorganic filling material,
b) 5 to 50 wt. % opacifier,
c) 1 to 25 wt. % hardening agent, and
d) mm 0.5 wt. % water,
wherein the hardening agent comprises CaO.

2. A shaped thermal insulation body according to claim 1, wherein it additionally has 1 to 20 wt. % inorganic fibrous material.

3. A shaped thermal insulation body according to claim 2, wherein the fibrous material is S2-glass.

4. A shaped thermal insulation body according to claim 1, wherein 0.5 to 35 wt. % water are present.

5. A shaped thermal insulation body according to claim 4, wherein approximately 15 wt. % water are present.

6. A shaped thermal insulation body according to claim 1, wherein the inorganic filling material proportion is 15 to 20 wt. %.

7. A shaped thermal insulation body according to claim 1, wherein the inorganic filling material is at least one element selected from the group consisting of fumed silica, arc silica, wollastonite, vermiculite, mica, vitreous bodies and mixtures thereof.

8. A shaped thermal insulation body according to claim 7, wherein the BET surface of the fumed silica is below 350 m$^2$/g.

9. A shaped thermal insulation body according to claim 8, wherein the BET surface of the fumed silica is approximately 130 m$^2$/g.

10. A shaped thermal insulation body according to claim 1, wherein the shaped thermal insulation body contains as the opacifier metal oxides.

11. A shaped thermal insulation body according to claim 10, wherein the shaped thermal insulation body contains as the opacifier TiO$_2$.

12. A shaped thermal insulation body according to claim 10, wherein the shaped thermal insulation body contains SIC as the opacifier.

13. A shaped thermal insulation body according to claim 1, wherein the shaped thermal insulation body further contains as hardening agents oxides of the II or III main group of the periodic table.

14. A shaped thermal insulation body according to claim 13, wherein the hardening agent further comprises MgO.

15. A shaped thermal insulation body according to claim 1, wherein the shaped thermal insulation body further contains as hardening agents hydroxides of the II and III main group of the periodic table.

16. A shaped thermal insulation body according to claim 15, wherein the shaped thermal insulation body further contains as hardening agents an element from the following group: $Mg(OH)_2$, $Ca(OH)_2$, $B(OH)_3$ and/or $Al(OH)_3$.

17. A shaped thermal insulation body according to claim 1, wherein the shaped thermal insulation body further contains as hardening agents mixed oxides from the following group: II, III or IV main group of the periodic table.

18. A shaped thermal insulation body according to claim 17, wherein the shaped thermal insulation body contains cements as hardening agents.

19. A shaped thermal insulation body, wherein it is produced whilst excluding water glass.

* * * * *